United States Patent
Chen

(10) Patent No.: US 11,070,096 B2
(45) Date of Patent: Jul. 20, 2021

(54) ELECTRONIC EQUIPMENT, METHOD AND DEVICE FOR CONTROLLING CHARGING, AND STORAGE MEDIUM

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 16 days.

(21) Appl. No.: 16/737,685

(22) Filed: Jan. 8, 2020

(65) Prior Publication Data

US 2021/0066972 A1 Mar. 4, 2021

(30) Foreign Application Priority Data

Sep. 4, 2019 (CN) .......................... 201910833605.1

(51) Int. Cl.
*H02J 50/80* (2016.01)
*H02J 50/90* (2016.01)
*H02J 50/20* (2016.01)
*H02J 50/40* (2016.01)

(52) U.S. Cl.
CPC .............. *H02J 50/80* (2016.02); *H02J 50/20* (2016.02); *H02J 50/40* (2016.02); *H02J 50/90* (2016.02)

(58) Field of Classification Search
CPC .. H02J 50/80; H02J 50/90; H02J 50/20; H02J 50/40
See application file for complete search history.

(56) References Cited

U.S. PATENT DOCUMENTS

2012/0274154 A1 11/2012 Deluca
2018/0166926 A1 6/2018 Vilenskiy et al.

FOREIGN PATENT DOCUMENTS

| EP | 3 552 295 A1 | 10/2019 |
| KR | 10-2012-0009929 A | 2/2012 |
| KR | 10-2003196 B1 | 7/2019 |
| WO | WO 2010/039246 A1 | 4/2010 |
| WO | WO 2018/111921 A1 | 6/2018 |

OTHER PUBLICATIONS

Extended European Search Report dated May 12, 2020 in European Patent Application No. 20151623.4, 8 pages.

*Primary Examiner* — Robert L Deberadinis
(74) *Attorney, Agent, or Firm* — Oblon, McClelland, Maier & Neustadt, L.L.P.

(57) ABSTRACT

An energy region covering second electronic equipment is determined by scanning energy regions coverable respectively by energy radiated by electronic equipment in distinct directions. An energy sub-region covering the second electronic equipment is determined by scanning energy sub-regions of the energy region covering the second electronic equipment. The energy sub-regions are coverable respectively by the energy radiated in distinct directions. A wireless charging signal can be radiated towards the energy sub-region that is determined to be covering the second electronic equipment.

15 Claims, 13 Drawing Sheets

ELECTRONIC EQUIPMENT, METHOD AND DEVICE FOR CONTROLLING CHARGING, AND STORAGE MEDIUM

CROSS-REFERENCE TO RELATED APPLICATIONS

This application is based on, and claims benefit of priority to Chinese Application No. 201910833605.1 filed on Sep. 4, 2019. The disclosure of the Chinese Application is hereby incorporated by reference in its entirety.

BACKGROUND

With rapid development of science and technology, it has become indispensable to have electronic equipment such as mobile phones and tablet computers in daily life. Such electronic equipment may consume much power and have to be charged frequently.

Electrical equipment may be charged by connecting the electrical equipment to power supply equipment using a charging cable. This however may require a user to insert and unplug the charging cable frequently, which tends to damage a data interface of user equipment. Moreover, this may set a limit to the distance between charging equipment and electrical equipment during charging, which fails to meet an actual charging demand.

SUMMARY

The present disclosure relates to the field of electronic equipment, and in particular to electronic equipment, a method and device for controlling charging, and a storage medium.

According to an aspect of embodiments of the present disclosure, a method for controlling charging applies to electronic equipment. The method can include determining an energy region covering second electronic equipment by scanning energy regions coverable respectively by energy radiated by the electronic equipment in distinct directions, determining an energy sub-region covering the second electronic equipment by scanning energy sub-regions of the energy region covering the second electronic equipment, the energy sub-regions being coverable respectively by the energy radiated in distinct directions, and radiating a wireless charging signal toward the energy sub-region covering the second electronic equipment.

According to an aspect of embodiments of the present disclosure, a device for controlling charging by electronic equipment can include a processor and memory. The memory can be adapted to store an instruction executable by the processor. The processor can be adapted to determine an energy region covering second electronic equipment by scanning energy regions coverable respectively by energy radiated by the electronic equipment in distinct directions, determine an energy sub-region covering the second electronic equipment by scanning energy sub-regions of the energy region covering the second electronic equipment, the energy sub-regions being coverable respectively by the energy radiated in distinct directions, and radiate a wireless charging signal toward the energy sub-region covering the second electronic equipment.

According to an aspect of embodiments of the present disclosure, a non-transitory computer-readable storage medium has stored thereon an instruction that, when executed by a processor of electronic equipment, causes the electronic equipment to perform at least part of a method for controlling charging. The method can include determining an energy region covering second electronic equipment by scanning energy regions coverable respectively by energy radiated by the electronic equipment in distinct directions, determining an energy sub-region covering the second electronic equipment by scanning energy sub-regions of the energy region covering the second electronic equipment, the energy sub-regions being coverable respectively by the energy radiated in distinct directions, and radiating a wireless charging signal toward the energy sub-region covering the second electronic equipment.

The above general description and elaboration below are but exemplary and explanatory, and do not limit the subject disclosure.

BRIEF DESCRIPTION OF THE DRAWINGS

Drawings here are incorporated in and constitute part of the present specification, illustrate exemplary embodiments according to the present disclosure, and together with the present specification, serve to explain the principle of the present invention.

DETAILED DESCRIPTION

Figure 1:
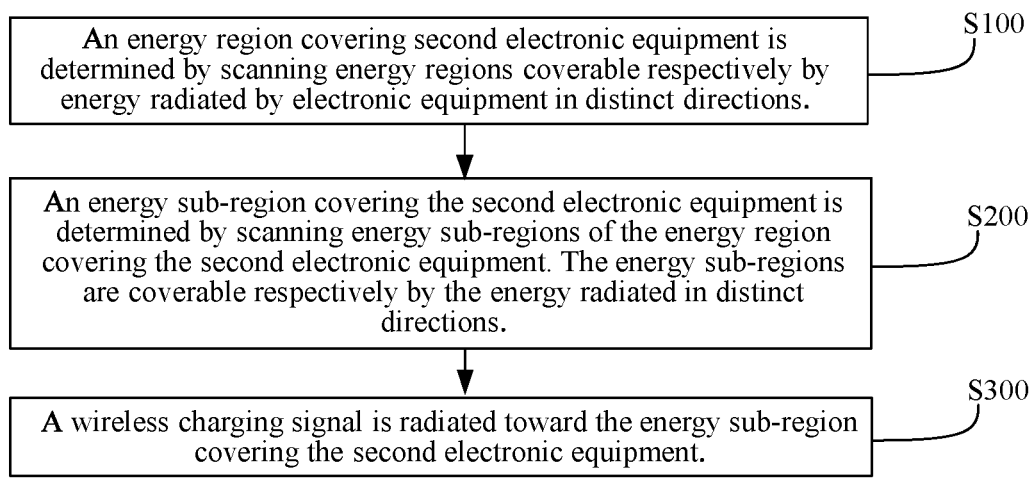
FIG. 1 is a flowchart of a method for controlling charging according to an exemplary embodiment.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are merely examples of the apparatus and method in accordance with certain aspects herein as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that."

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in the form of software, in one or more hardware modules or integrated circuits, or in different networks and/or processor devices and/or microcontroller devices.

FIG. 1 is a flowchart of a method for controlling charging according to an exemplary embodiment. As shown in FIG. 1, the method for controlling charging may apply to electronic equipment, which may also be referred to as first electronic equipment herein. The method may include one or more options as follows.

In S100, an energy region (which may also be referred to as a first energy region herein) that covers second electronic equipment is determined by scanning energy regions (i.e., first energy regions) coverable respectively by energy radiated by the electronic equipment (i.e., the first electronic equipment) in distinct directions.

Subsequently in S200, an energy sub-region covering the second electronic equipment is determined by scanning energy sub-regions of the energy region covering the second electronic equipment. The energy sub-regions are coverable respectively by the energy radiated in distinct directions.

In S300, a wireless charging signal is radiated toward the energy sub-region covering the second electronic equipment.

Figure 2:
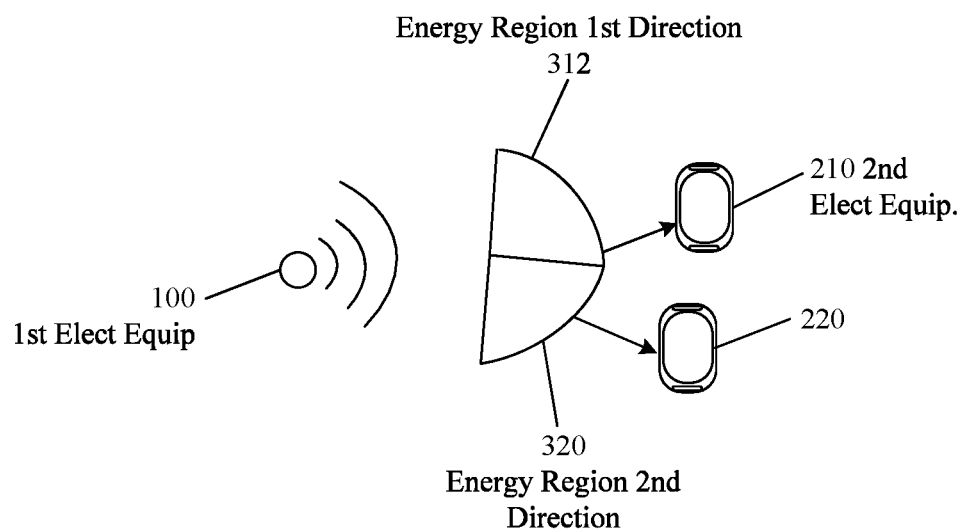
FIG. 2 is a diagram of a scan-to-aim process according to an exemplary embodiment.

FIG. 2 illustrates an exemplary scan-to-aim process. As shown in FIG. 2, a range coverable by the energy radiated by the electronic equipment may include an energy region 310 coverable by the energy radiated in a first direction and an energy region 320 coverable by the energy radiated in a second direction. Energy regions 310 and 320 may be covered respectively by the energy radiated in two different directions. In S100, the first electronic equipment 100 may use a first beam to scan the energy regions coverable respectively by the energy radiated in different directions, to determine the energy region covering (i.e., containing the location of) the second electronic equipment 210 as the energy region 310, for example, thereby achieving rough aim at the second electronic equipment 210. A first energy region may be covered by the energy radiated by the first electronic equipment in an outward direction.

Figure 3:
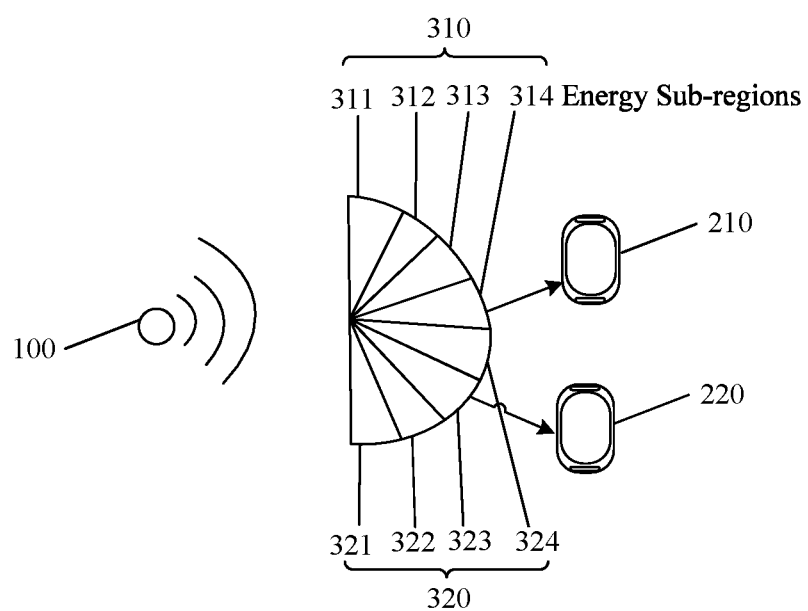
FIG. 3 is a diagram of a scan-to-aim process according to an exemplary embodiment.

FIG. 3 illustrates another exemplary scan-to-aim process. As shown in FIG. 3, the energy region 310 may include energy sub-regions 311, 312, 313, and 314 coverable respectively by the energy radiated in different directions.

In S200, after it is determined that the energy region covering the second electronic equipment 210 is the energy region 310, the first electronic equipment 100 may scan the energy sub-regions 311, 312, 313, and 314 one by one using a second beam, until the energy sub-region covering the second electronic equipment 210 (i.e., where the second electronic equipment is located) is determined to be the energy sub-region 314, for example, thereby achieving fine aim at (i.e., pinpointing) the second electronic equipment 210. The second beam may be less than the first beam in width.

Exemplarily, the first electronic equipment may include power equipment provided with a primary coil that converts a Direct-Current (DC) voltage into an Alternating-Current (AC) voltage signal. In S300, the first electronic equipment may radiate a wireless charging signal toward the energy sub-region covering the second electronic equipment through the primary coil using the AC voltage signal.

On one hand, compared to a solution of determining an energy sub-region covering the second electronic equipment by scanning energy sub-regions of all energy regions coverable by the energy radiated by the first electronic equipment, with one or more embodiments of the present disclosure, the energy region covering the second electronic equipment is determined by scanning energy regions coverable respectively by energy radiated by the first electronic equipment in different directions. Then, the energy sub-region covering the second electronic equipment is further determined by scanning energy sub-regions of the energy region covering the second electronic equipment. The energy sub-regions are coverable respectively by the energy radiated in distinct directions. In this way, a number of energy sub-regions required to be scanned for pinpointing the second electronic equipment can be reduced. Time required for pinpointing the second electronic equipment can be reduced. Efficiency in pinpointing the second electronic equipment can be improved.

On the other hand, compared to wired charging, with one or more embodiments of the present disclosure, no charging cable for connecting the first electronic equipment to the second electronic equipment is required. The second electronic equipment may be charged by coupling an electromagnetic wave in space by radiating a wireless charging signal toward the second electronic equipment. This may reduce the limit to the distance between the first electronic equipment and the second electronic equipment during charging, rendering more flexibility in charging. In addition, compared to a solution of radiating a wireless charging signal toward all energy regions coverable by the energy radiated by the first electronic equipment, with one or more embodiments of the present disclosure, the wireless charging signal may be radiated toward the energy sub-region where the second electronic equipment is located, reducing a loss in wireless charging, improving efficiency in wireless charging.

By transmitting a detection signal, it may be determined whether second electronic equipment has entered a range coverable by the energy radiated by the electronic equipment.

The S100 may be implemented as follows. When it is determined that second electronic equipment is in the range coverable by the energy radiated by the electronic equipment, the energy region covering the second electronic equipment may be determined by scanning the energy regions coverable respectively by the energy radiated in the distinct directions in the range coverable by the energy radiated. The first electronic equipment may transmit a detection signal periodically in the range coverable by the energy radiated. For example, when the first electronic equipment is in a wireless local area network (Wireless Fidelity, Wi-Fi) environment and may communicate with other electronic equipment through the wireless local area network, the first electronic equipment may send a detection signal in the range coverable by the energy radiated such as by broadcast. Having received the detection signal, second electronic equipment may send, to the first electronic equipment, a signal confirming that the second electronic equipment has entered the radiation range of the electronic equipment.

Compared to a solution where the electronic equipment always radiates (i.e., keeps radiating) a wireless charging signal in the range coverable by the energy radiated, with the embodiment, scan to aim at the second electronic equipment is performed and the wireless charging signal is radiated only when it is confirmed that the second electronic equipment has entered the range coverable by the energy radiated by the electronic equipment, saving power consumption by the electronic equipment for scanning the range coverable by the energy radiated by the electronic equipment.

The S300 may be implemented as follows. The wireless charging signal may be radiated toward each energy sub-region covering the second electronic equipment.

As shown in FIG. 3, the energy region 320 may include energy sub-regions 321, 322, 323, and 324 coverable respectively by the energy radiated in different directions. Second electronic equipment 210 may be located in the energy sub-region 314 in the energy region 310. Second electronic equipment 220 may be located in the energy sub-region 323 in the energy region 320. The first electronic equipment 100 may radiate the wireless charging signal respectively toward both the energy sub-region 314 and the energy sub-region 323 to charge the second electronic equipment 210 and the second electronic equipment 220.

Figure 4:
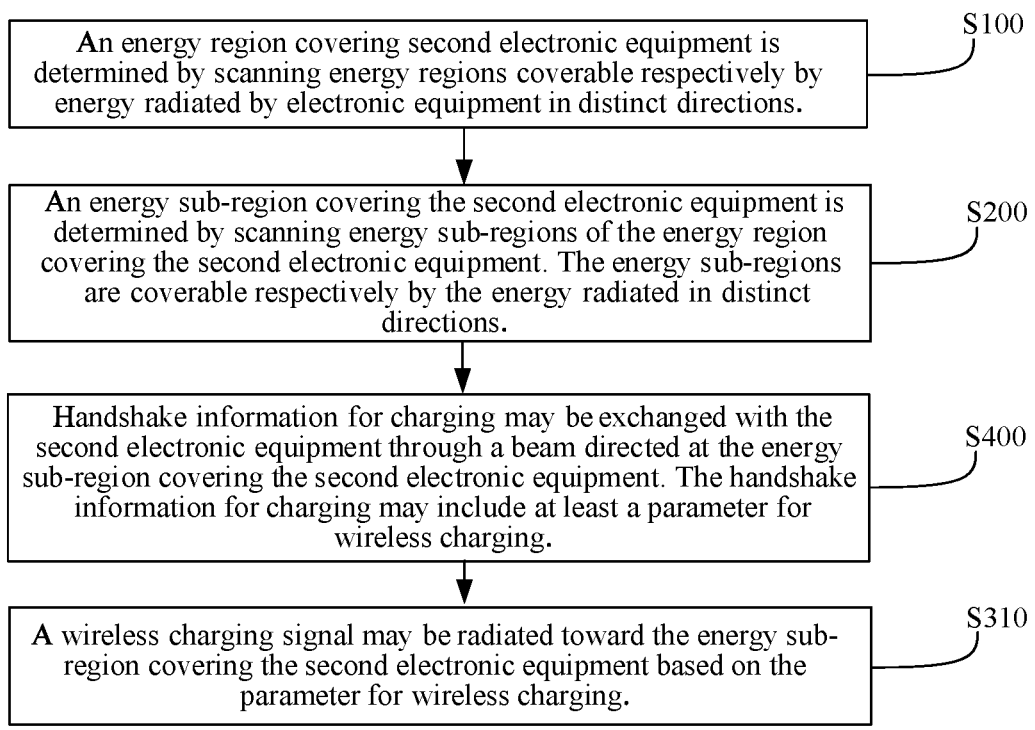
FIG. 4 is a flowchart of a method for controlling charging according to an exemplary embodiment.

As shown in FIG. 4, the method may further include an option as follows. In S400, handshake information for charging may be exchanged with the second electronic equipment through a beam directed at the energy sub-region covering the second electronic equipment. The handshake information for charging may include at least a parameter for wireless charging.

The S300 may be implemented as shown in S310. In S310, a wireless charging signal may be radiated toward the energy sub-region covering the second electronic equipment based on the parameter for wireless charging.

Exemplarily, the parameter for wireless charging may include a power for wireless charging, strength of the wireless charging signal and the like.

In the embodiment, handshake information for charging may be exchanged through a beam directed at the energy sub-region covering the second electronic equipment. Thus, the electronic equipment is allowed to communicate with the second electronic equipment to determine the charging power of the wireless charging signal that the electronic equipment may radiate, or the charging power of the wireless charging signal that the second electronic equipment may bear. Further, the electronic equipment may radiate a wireless charging signal toward the energy sub-region covering the second electronic equipment based on the parameter for wireless charging. In this way, a charging strategy may be communicated before the second charging equipment is charged, such that the electronic equipment charges the second electronic equipment according to the parameter for wireless charging, ensuring charging effect.

In response to a change in a parameter for wireless charging of the second electronic equipment by the electronic equipment, indication information indicating the change in the parameter for wireless charging may be modulated onto a carrier of the wireless charging signal.

The S300 may be implemented as follows. The wireless charging signal carrying the indication information may be radiated toward the energy sub-region covering the second electronic equipment.

Exemplarily, the indication information may be modulated in information on an amplitude, a phase, or a frequency of the carrier of the wireless charging signal. For example, the indication information may be modulated in the amplitude of the carrier of the wireless charging signal through Quadrature Amplitude Modulation (QAM).

Exemplarily, a parameter for wireless charging may change due to at least one of a decrease in electric energy stored in the electronic equipment, an increase in battery remaining in the second electronic equipment, or a change in the distance between the electronic equipment and the second electronic equipment, and the like.

For example, charging the second charging equipment may lower the electric energy stored in the electronic equipment. When the electric energy stored in the electronic equipment is lowered to a first electric energy threshold, the electronic equipment may lower the power of the wireless charging signal radiated, thereby lowering the rate at which the electric energy stored in the electronic equipment decreases.

As another example, battery remaining in the second electronic equipment may increase from a first level to a second level after the second electronic equipment is charged. Power required for charging the second electronic equipment may decrease from first power to second power. Then, the electronic equipment may lower the strength of the wireless charging signal radiated toward the energy sub-region covering the second electronic equipment from a first strength to a second strength.

For example, the first level may be 20% of the battery capacity. The second level may be 80% of the battery capacity. When battery remaining in the second electronic equipment is the first level, the electronic equipment may radiate the wireless charging signal toward the energy sub-region covering the second electronic equipment using the first power, such that the second electronic equipment may be charged quickly, lowering risk of depleting battery of the second electronic equipment due to low charging power.

As another example, the distance between the electronic equipment and the second electronic equipment may increase from a first distance to a second distance. Then, the electronic equipment may increase the strength of the wireless charging signal radiated toward the energy sub-region covering the second electronic equipment, and modulate indication information indicating the increase in the strength of the wireless charging signal onto the carrier of the wireless charging signal.

With the embodiment, by modulating the indication information onto the carrier of the wireless charging signal, the second electronic equipment may be informed of a change in a parameter for wireless charging while being irradiated by a changed wireless charging signal.

Figure 5:
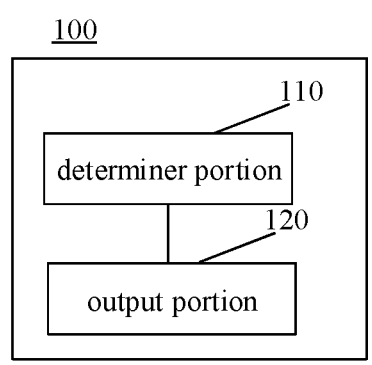
FIG. 5 is a diagram of electronic equipment according to an exemplary embodiment.

FIG. 5 is a block diagram of electronic equipment 100 according to an exemplary embodiment. The electronic equipment may also be also referred to as first electronic equipment. The electronic equipment may include a determiner portion 110 and an output portion 120.

The determiner portion 110 can be adapted to determining an energy region covering second electronic equipment by scanning energy regions coverable respectively by energy radiated by the electronic equipment in distinct directions. The determiner portion 110 may be further adapted to determining an energy sub-region covering the second electronic equipment by scanning energy sub-regions of the energy region covering the second electronic equipment, the energy sub-regions being coverable respectively by the energy radiated in distinct directions.

The output portion 120 can be adapted to radiating a wireless charging signal toward the energy sub-region covering the second electronic equipment.

On one hand, compared to a solution of determining an energy sub-region covering the second electronic equipment by scanning energy sub-regions of all energy regions coverable by the energy radiated by the first electronic equipment, with one or more embodiments of the present disclosure, the energy region covering the second electronic equipment is determined by scanning energy regions coverable respectively by energy radiated by the first electronic equipment in different directions. Then, the energy sub-region covering the second electronic equipment is further determined by scanning energy sub-regions of the energy region covering the second electronic equipment. The energy sub-regions are coverable respectively by the energy radiated in distinct directions. In this way, a number of energy sub-regions required to be scanned for pinpointing the second electronic equipment is reduced. Time required for pinpointing the second electronic equipment is reduced. Efficiency in pinpointing the second electronic equipment is improved.

On the other hand, compared to wired charging, with one or more embodiments of the present disclosure, no charging cable for connecting the first electronic equipment to the second electronic equipment is required. The second electronic equipment may be charged by radiating a wireless charging signal toward the second electronic equipment. This may reduce the limit to the distance between the first electronic equipment and the second electronic equipment during charging, rendering more flexibility in charging. In addition, compared to a solution of radiating a wireless charging signal toward all energy regions coverable by the energy radiated by the first electronic equipment, with one or more embodiments of the present disclosure, the wireless charging signal may be radiated toward the energy sub-region where the second electronic equipment is located, reducing a loss in wireless charging, improving efficiency in wireless charging.

Figure 6:
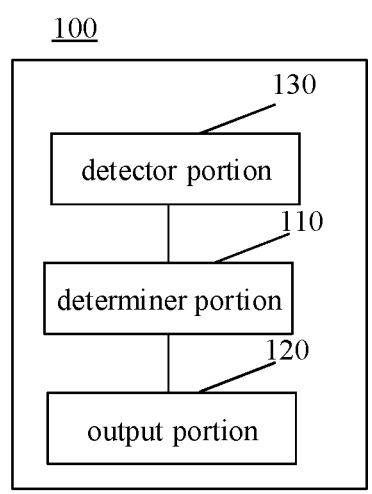
FIG. 6 is a diagram of electronic equipment according to an exemplary embodiment.

As shown in FIG. 6, the electronic equipment 100 may further include a detector portion 130. The detector portion 130 may be adapted to determining, by transmitting a detection signal, whether the second electronic equipment has entered a range coverable by the energy radiated by the electronic equipment.

The determiner portion 110 may be adapted to, in response to determining that the second electronic equipment is in the range coverable by the energy radiated by the electronic equipment, determining the energy region covering the second electronic equipment by scanning the energy regions coverable respectively by the energy radiated in the distinct directions in the range coverable by the energy radiated.

The output portion 120 may be adapted to radiating the wireless charging signal toward each energy sub-region covering the second electronic equipment. The output portion 120 may include an antenna supporting a multiple-input multiple-output function.

Compared to a solution of successive charging of multiple second electronic equipment one by one, the first electronic equipment according to the embodiment may charge multiple second electronic equipment at the same time and meet a demand for charging multiple second electronic equipment simultaneously, improving user experience.

Figure 7:
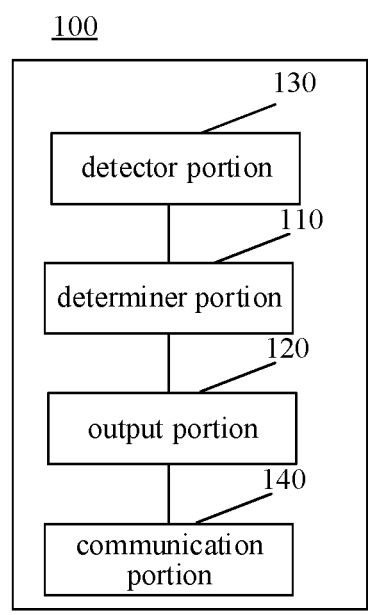
FIG. 7 is a diagram of electronic equipment according to an exemplary embodiment.

As shown in FIG. 7, the electronic equipment 100 may further include a communication portion 140. The communication portion 140 may be adapted to exchanging, with the second electronic equipment through a beam directed at the energy sub-region covering the second electronic equipment, handshake information for charging. The handshake information for charging may include at least a parameter for wireless charging.

The output portion 120 may be adapted to radiating the wireless charging signal toward the energy sub-region covering the second electronic equipment based on the parameter for wireless charging.

The first electronic equipment 100 may further include a modulator portion. The modulator portion may be adapted to, in response to a change in a parameter for wireless charging of the second electronic equipment by the electronic equipment, modulating indication information indicating the change in the parameter for wireless charging onto a carrier of the wireless charging signal.

The output portion 120 may be adapted to radiating the wireless charging signal carrying the indication information toward the energy sub-region covering the second electronic equipment.

Example 1

Figure 8:
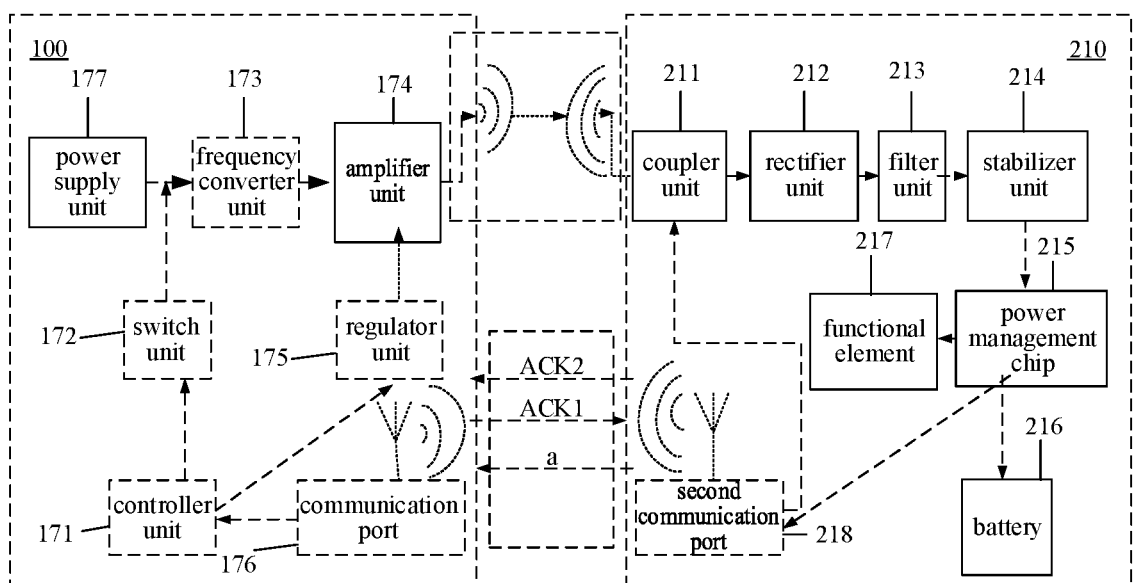
FIG. 8 is a diagram of a charging system according to an exemplary embodiment.

FIG. 8 is a diagram of a charging system according to an exemplary embodiment. As shown in FIG. 8, when the second electronic equipment 210 enters the range coverable by the energy radiated by the first electronic equipment 100, the (first) electronic equipment may exchange handshake information for charging with the second electronic equipment. The electronic equipment may perform wireless communication with the second electronic equipment based on a wireless local area network Wi-Fi, Bluetooth, Zigbee, an infrared communication protocol, and the like.

A signal a may be sent by the second communication port 218 of the second electronic equipment to the electronic equipment informing that the second electronic equipment has entered the zone coverable by the energy radiated by the electronic equipment. When receiving the signal a sent by the second electronic equipment, the first communication port 176 of the electronic equipment may send a first acknowledgement signal (ACK1) to the second electronic equipment. When receiving the ACK1 sent by the electronic equipment, the second electronic equipment may send, to the electronic equipment, a second acknowledgement signal (ACK2) indicating that the second electronic equipment has received the acknowledgement signal ACK1. In this way, the electronic equipment may complete a handshake for charging and establish a communication connection with the second electronic equipment. The handshake information for charging may include the signal a, the ACK1, the ACK2, etc.

In addition, during the handshake for charging of the electronic equipment with the second electronic equipment, the handshake information for charging may include at least a parameter for wireless charging. For example, the ACK2 sent by the second electronic equipment may include a value of the charging power required to charge the second electronic equipment.

For example the parameter for wireless charging may be the charging power required to charge the second electronic equipment. After the electronic equipment has learned the charging power, a controller unit 171 may regulate, according to the charging power, the power of the wireless charging signal radiated. For example, the controller unit 171 may control a switch unit 172 to turn on. Then, a wireless charging signal provided by a power supply unit 177 may be processed by a frequency converter unit 173 and then by an amplifier unit 174, such that power of the wireless charging signal may be regulated. Then, the wireless charging signal may be radiated, via the amplifier unit 174, toward the energy sub-region covering the second electronic equipment. A regulator unit 175 may be adapted to controlling regulation of the wireless charging signal by the amplifier unit 174.

When the electronic equipment detects that multiple second electronic equipment have entered the range coverable by the energy radiated by the electronic equipment, the controller unit 171 may send a control instruction to increase the total power of the wireless charging signal radiated by the electronic equipment. When the electronic equipment detects that the number of the second electronic equipment in the range coverable by the energy radiated by the electronic equipment has decreased to 0, the controller unit 171 may control the switch unit 172 to turn off. The electronic equipment may then stop radiating the wireless charging signal toward the range coverable by the energy radiated by the electronic equipment, such that energy loss may be reduced.

Figure 9A:
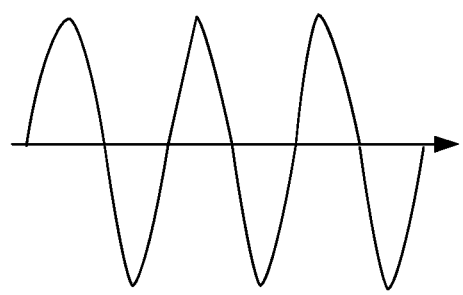
FIGS. 9a-9d are diagrams of various signals according to exemplary embodiments.
Figure 9B:
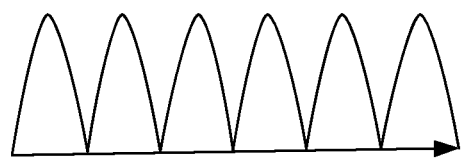
Figure 9C:
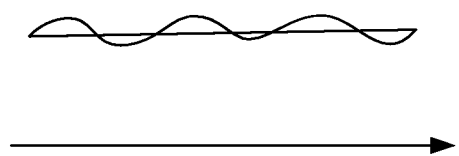
Figure 9D:
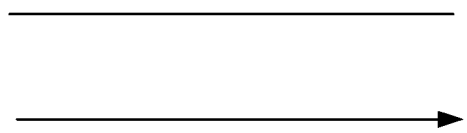

A coupler unit 211 of the second electronic equipment may receive a wireless charging signal radiated by the electronic equipment, such as the AC signal as shown in FIG. 9a. A rectifier unit 212 in the second electronic equipment may rectify the received wireless charging signal to form an AC signal having a waveform as shown in FIG. 9b. A filter unit 213 may filter the rectified AC signal to acquire a fluctuating DC signal as shown in FIG. 9c. A stabilizer unit 214 may stabilize voltage of the fluctuating DC signal to acquire a DC charging signal of a smooth waveform as shown in FIG. 9d. The DC charging signal may be sent to a power management chip 215. The DC charging signal may enter the power management chip PMIC through a DC input pin (DC-IN-Pin) of the Power Management Integrated Chip (PMIC).

The power management chip 215 may transmit the DC charging signal to a functional element 217 of the second electronic equipment to power the functional element. The power management chip 215 may also send the DC charging signal to a battery 216 to charge the battery 216. The functional element 217 may include an image collector element, a display element, a distance detector element, and/or the like.

Exemplarily, when the coupler unit 211 of the second electronic equipment is capable of transmitting energy, the second electronic equipment may transmit electric energy in the battery 216 into a range coverable by energy radiated by the second electronic equipment, to charge any other electronic equipment located in the range coverable by the energy radiated by the second electronic equipment.

Refer to an exemplary method herein for elaboration of a way a portion of the device herein executes an operation, which is not repeated here.

Figure 10:
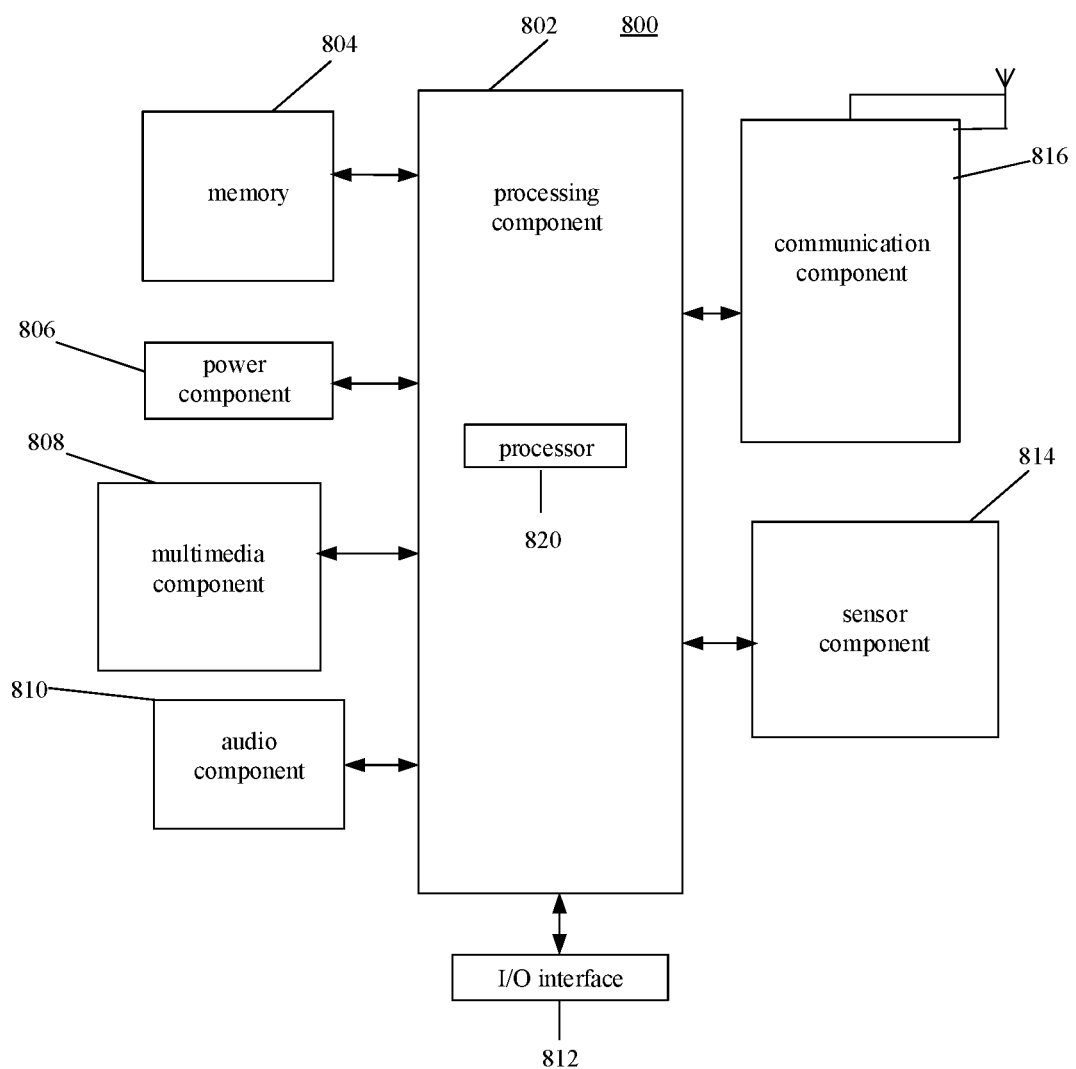
FIG. 10 is a block diagram of a device according to an exemplary embodiment.

FIG. 10 is a block diagram of a device 800 for controlling charging according to an exemplary embodiment. For example, the device 800 may be a mobile phone, a computer, a digital broadcast UE, a messaging device, a gaming console, a tablet, a medical device, exercise equipment, a personal digital assistant, and the like.

Referring to FIG. 10, the device 800 may include at least one of a processing component 802, memory 804, a power component 806, a multimedia component 808, an audio component 810, an Input/Output (I/O) interface 812, a sensor component 814, or a communication component 816.

The processing component 802 may generally control an overall operation of the device 800, such as operations associated with display, a telephone call, data communication, a camera operation, a recording operation, and the like. The processing component 802 may include one or more processors 820 to execute instructions so as to complete all or a part of an aforementioned method. In addition, the processing component 802 may include one or more portions to facilitate interaction between the processing component 802 and other components. For example, the processing component 802 may include a multimedia portion to facilitate interaction between the multimedia component 808 and the processing component 802.

The memory 804 may be adapted to storing various types of data to support the operation at the device 800. Examples of such data may include instructions of any application or method adapted to operating on the device 800, contact data, phonebook data, messages, pictures, videos, etc. The memory 804 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, and the like.

The power component 806 may supply electric power to various components of the device 800. The power component 806 may include a power management system, one or more power sources, and other components related to generating, managing, and distributing electricity for the device 800.

The multimedia component 808 may include a screen that provides an output interface between the device 800 and a user. The screen may include a Liquid Crystal Display (LCD), a Touch Panel (TP), and the like. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 808 may include at least one of a front camera or a rear camera. When the device 800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 810 may be adapted to outputting and/or inputting an audio signal. For example, the audio component 810 may include a microphone (MIC). When the device 800 is in an operation mode such as a call mode, a recording mode, a voice recognition mode, and the like, the MIC may be adapted to receiving an external audio signal. The received audio signal may be further stored in the memory 804 or may be sent via the communication component 816. The audio component 810 may further include a loudspeaker adapted to outputting the audio signal.

The I/O interface 812 may provide an interface between the processing component 802 and a peripheral interface portion. Such a peripheral interface portion may be a keypad, a click wheel, a button, etc. Such a button may include but is not limited to at least one of a homepage button, a volume button, a start button, or a lock button.

The sensor component 814 may include one or more sensors for assessing various states of the device 800. For example, the sensor component 814 may detect an on/off state of the device 800 and relative positioning of components such as the display and the keypad of the device 800. The sensor component 814 may further detect a change in the position of the device 800 or of a component of the device 800, whether there is contact between the device 800 and a user, the orientation or acceleration/deceleration of the device 800, a change in the temperature of the device 800, etc. The sensor component 814 may include a proximity sensor adapted to detecting existence of a nearby object without physical contact. The sensor component 814 may further include an optical sensor such as a Complementary Metal-Oxide-Semiconductor (CMOS) or a Charge-Coupled-Device (CCD) image sensor used in an imaging application. The sensor component 814 may further include an acceleration sensor, a gyroscope sensor, a magnetic sensor, a pressure sensor, a temperature sensor, etc.

The communication component 816 may be adapted to facilitating wired or wireless communication between the device 800 and other equipment. The device 800 may access a wireless network based on any communication standard such as Wi-Fi, 2G, 3G, and the like, or a combination thereof. The communication component 816 may broadcast related information or receive a broadcast signal from an external broadcast management system via a broadcast channel. The communication component 816 may include a Near Field Communication (NFC) portion for short-range communication. For example, the NFC portion may be based on technology such as Radio Frequency Identification (RFID), Infrared Data Association (IrDA), Ultra-Wideband (UWB) technology, Bluetooth (BT), and the like.

The device 800 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, and the like, to implement an aforementioned method.

A non-transitory computer-readable storage medium including instructions, such as memory 804 including instructions, may be provided. The instructions may be executed by the processor 820 of the device 800 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, and the like.

A device for controlling charging by electronic equipment includes a processor and memory. The memory can be adapted to storing an instruction executable by the processor. The processor can be adapted to determine an energy region covering second electronic equipment by scanning energy regions coverable respectively by energy radiated by the electronic equipment in distinct directions, determine an energy sub-region covering the second electronic equipment by scanning energy sub-regions of the energy region covering the second electronic equipment, the energy sub-regions being coverable respectively by the energy radiated in distinct directions, and radiate a wireless charging signal toward the energy sub-region covering the second electronic equipment.

A non-transitory computer-readable storage medium has stored thereon an instruction that, when executed by a processor of electronic equipment, causes the electronic equipment to perform at least part of a method for controlling charging. The electronic equipment may be first electronic equipment. The method can include determining an energy region covering second electronic equipment by scanning energy regions coverable respectively by energy radiated by the electronic equipment in distinct directions, determining an energy sub-region covering the second electronic equipment by scanning energy sub-regions of the energy region covering the second electronic equipment, the energy sub-regions being coverable respectively by the energy radiated in distinct directions, and radiating a wireless charging signal toward the energy sub-region covering the second electronic equipment.

The processor may be a Central Processing Unit (CPU), a general purpose processor, a Digital Signal Processor (DSP), an Application Specific Integrated Circuit (ASIC), and/or the like. A general purpose processor may be a microprocessor, any conventional processor, and/or the like. Aforementioned memory may be a Read-Only Memory (ROM), a Random Access Memory (RAM), a flash memory, a hard disk, a solid state disk, and/or the like. A Subscriber Identity Module (SIM) card, also referred to as a smart card, may have to be installed on a digital mobile phone before the phone can be used. Content, such as information on a user of the digital mobile phone, an encryption key, a phonebook of the user, may be stored on the computer chip. An option of the method according to any combination of embodiments herein may be executed by a hardware processor, or by a combination of hardware and software modules in the processor.

Herein by "multiple", it may mean two or more. A term "and/or" may describe an association between associated objects, including three possible relationships. For example, by A and/or B, it may mean that there may be three cases, namely, existence of but A, existence of both A and B, or existence of but B. A slash mark "/" may generally denote an "or" relationship between two associated objects that come respectively before and after the mark per se.

Other embodiments herein will be apparent to one skilled in the art after he/she has considered the subject disclosure and practiced the invention disclosed herein. The subject application is intended to cover any variation, use, or adaptation of the subject disclosure following the general principle of the subject disclosure and including such departures from the subject disclosure as come within known or customary practice in the art. The subject disclosure and its embodiments are intended to be exemplary only, with a true scope and spirit of the subject disclosure being indicated by the appended claims.

The subject disclosure is not limited to the exact construction that has been described above and illustrated in the accompanying drawings. Various modifications and changes can be made without departing from the scope of the subject disclosure. It is intended that the scope of the subject disclosure be limited only by the appended claims.

What is claimed is:

1. A method of wireless charging, comprising:
    determining an energy region from a plurality of energy regions associated with electronic equipment that covers second electronic equipment by scanning the plurality of energy regions in which energy can be radiated by the electronic equipment in distinct directions corresponding to the plurality of energy regions;
    determining an energy sub-region that covers the second electronic equipment by scanning energy sub-regions of the determined energy region covering the second electronic equipment, the energy sub-regions being coverable respectively by the energy radiated in distinct directions; and
    radiating a wireless charging signal toward the determined energy sub-region covering the second electronic equipment.

2. The method of claim 1, further comprising:
    determining, by transmitting a detection signal, whether the second electronic equipment has entered a range coverable by the energy radiated by the electronic equipment,
    wherein the determining the energy region from the plurality of energy regions associated with electronic equipment that covers the second electronic equipment by scanning the plurality of energy regions in which energy can be radiated by the electronic equipment further comprises:
    in response to determining that the second electronic equipment is in the range coverable by the energy radiated by the electronic equipment, determining the energy region covering the second electronic equipment by scanning the plurality of energy regions coverable respectively by the energy radiated in the distinct directions in the range coverable by the energy radiated.

3. The method of claim 1, wherein the radiating a wireless charging signal toward the energy sub-region covering the second electronic equipment comprises:
    radiating the wireless charging signal toward each energy sub-region covering the second electronic equipment.

4. The method of claim 1, further comprising:
    exchanging, with the second electronic equipment through a beam directed at the energy sub-region covering the second electronic equipment, handshake information for charging, wherein the handshake information for charging comprises at least a parameter for wireless charging,
    wherein the radiating a wireless charging signal toward the energy sub-region covering the second electronic equipment further comprises:
    radiating the wireless charging signal toward the energy sub-region covering the second electronic equipment based on the parameter for wireless charging.

5. The method of claim 1, further comprising:
    in response to a change in a parameter for wireless charging of the second electronic equipment by the electronic equipment, modulating indication information indicating the change in the parameter for wireless charging onto a carrier of the wireless charging signal,
    wherein the radiating a wireless charging signal toward the energy sub-region covering the second electronic equipment further comprises:
    radiating the wireless charging signal carrying the indication information toward the energy sub-region covering the second electronic equipment.

6. A device for controlling wireless charging, comprising:
    a memory that is adapted to store instructions; and
    a processor that is configured to execute the instructions stored on the memory and perform the process of:
    determining an energy region from a plurality of energy regions associated with electronic equipment that covers second electronic equipment by scanning the plurality of energy regions in which energy can be radiated by the electronic equipment in distinct directions corresponding to the plurality of energy regions;
    determining an energy sub-region that covers the second electronic equipment by scanning energy sub-regions of the determined energy region covering the second electronic equipment, the energy sub-regions being coverable respectively by the energy radiated in distinct directions; and
    radiating a wireless charging signal toward the determined energy sub-region covering the second electronic equipment.

7. The device of claim 6, wherein the processor is further configured to:
    determine, by transmitting a detection signal, whether the second electronic equipment has entered a range coverable by the energy radiated by the electronic equipment,
    wherein the determining the energy region from the plurality of energy regions associated with electronic equipment that covers the second electronic equipment by scanning the plurality of energy regions in which energy can be radiated by the electronic equipment further comprises:
    in response to determining that the second electronic equipment is in the range coverable by the energy radiated by the electronic equipment, determining the energy region covering the second electronic equipment by scanning the plurality of energy regions coverable respectively by the energy radiated in the distinct directions in the range coverable by the energy radiated.

8. The device of claim 6, wherein the radiating a wireless charging signal toward the energy sub-region covering the second electronic equipment comprises:
    radiating the wireless charging signal toward each energy sub-region covering the second electronic equipment.

9. The device of claim 6, wherein the processor is further configured to:
    exchange, with the second electronic equipment through a beam directed at the energy sub-region covering the second electronic equipment, handshake information for charging, wherein the handshake information for charging comprises at least a parameter for wireless charging,
    wherein the radiating a wireless charging signal toward the energy sub-region covering the second electronic equipment further comprises:
    radiating the wireless charging signal toward the energy sub-region covering the second electronic equipment based on the parameter for wireless charging.

10. The device of claim 6, wherein the processor is further configured to:

in response to a change in a parameter for wireless charging of the second electronic equipment by the electronic equipment, modulate indication information indicating the change in the parameter for wireless charging onto a carrier of the wireless charging signal, wherein the radiating a wireless charging signal toward the energy sub-region covering the second electronic equipment further comprises:

radiating the wireless charging signal carrying the indication information toward the energy sub-region covering the second electronic equipment.

11. A non-transitory computer-readable storage medium having stored thereon an instruction that, when executed by a processor of electronic equipment, causes the electronic equipment to perform at least part of a method for controlling charging, the method comprising:

determining from a plurality of energy regions an energy region covering second electronic equipment by scanning the plurality of energy regions coverable respectively by energy radiated by the electronic equipment in distinct directions;

determining an energy sub-region covering the second electronic equipment by scanning energy sub-regions of the determined energy region covering the second electronic equipment, the energy sub-regions being coverable respectively by the energy radiated in distinct directions; and radiating a wireless charging signal toward the determined energy sub-region covering the second electronic equipment.

12. The storage medium of claim 11, the method further comprising:

determining, by transmitting a detection signal, whether the second electronic equipment has entered a range coverable by the energy radiated by the electronic equipment, wherein the determining an energy region covering second electronic equipment by scanning energy regions coverable respectively by energy radiated by the electronic equipment in distinct directions further comprises:

in response to determining that the second electronic equipment is in the range coverable by the energy radiated by the electronic equipment, determining the energy region covering the second electronic equipment by scanning the energy regions coverable respectively by the energy radiated in the distinct directions in the range coverable by the energy radiated.

13. The storage medium of claim 11, wherein the radiating a wireless charging signal toward the energy sub-region covering the second electronic equipment further comprises:

radiating the wireless charging signal toward each energy sub-region covering the second electronic equipment.

14. The storage medium of claim 11, the method further comprising:

exchanging, with the second electronic equipment through a beam directed at the energy sub-region covering the second electronic equipment, handshake information for charging, wherein the handshake information for charging comprises at least a parameter for wireless charging, wherein the radiating a wireless charging signal toward the energy sub-region covering the second electronic equipment further comprises:

radiating the wireless charging signal toward the energy sub-region covering the second electronic equipment based on the parameter for wireless charging.

15. The storage medium of claim 11, the method further comprising:

in response to a change in a parameter for wireless charging of the second electronic equipment by the electronic equipment, modulating indication information indicating the change in the parameter for wireless charging onto a carrier of the wireless charging signal, wherein the radiating a wireless charging signal toward the energy sub-region covering the second electronic equipment further comprises:

radiating the wireless charging signal carrying the indication information toward the energy sub-region covering the second electronic equipment.

* * * * *